(12) United States Patent
Jung et al.

(10) Patent No.: US 9,731,156 B2
(45) Date of Patent: Aug. 15, 2017

(54) FIXING BRACKET OF SPRINKLER

(71) Applicant: SEUNGJIN IND. CO., LTD., Ansan-si (Gyeonggi-do) (KR)

(72) Inventors: Hye Ri Jung, Ansan-si (KR); Woon Taek Jung, Ansan-si (KR)

(73) Assignee: Seungjin Ind. Co., Ltd. (KR)

( * ) Notice: Subject to any disclaimer, the term of this patent is extended or adjusted under 35 U.S.C. 154(b) by 0 days.

(21) Appl. No.: 14/985,768

(22) Filed: Dec. 31, 2015

(65) Prior Publication Data

US 2016/0199680 A1    Jul. 14, 2016

(30) Foreign Application Priority Data

Jan. 12, 2015  (KR) ........................ 10-2015-0004470
Jan. 12, 2015  (KR) ........................ 10-2015-0004471

(51) Int. Cl.
| | | |
|---|---|---|
| *A62C 35/68* | (2006.01) | |
| *F16B 2/10* | (2006.01) | |
| *F16L 3/12* | (2006.01) | |
| *A62C 37/11* | (2006.01) | |

(52) U.S. Cl.
CPC ................ *A62C 35/68* (2013.01); *F16B 2/10* (2013.01); *F16L 3/1222* (2013.01); *A62C 37/11* (2013.01)

(58) Field of Classification Search
CPC .. A62C 35/68; A62C 37/11; F16L 3/00; F16L 3/24; F16L 3/075; F16B 2/10
See application file for complete search history.

(56) References Cited

U.S. PATENT DOCUMENTS

| | | | |
|---|---|---|---|
| 2013/0048822 A1* | 2/2013 | Liu | F16B 2/10 248/316.5 |
| 2014/0360737 A1* | 12/2014 | Kim | F16L 3/00 169/51 |
| 2015/0060613 A1* | 3/2015 | Lim | A62C 35/68 248/75 |

* cited by examiner

*Primary Examiner* — Amy Sterling
(74) *Attorney, Agent, or Firm* — Mendelsohn Dunleavy, P.C.

(57) ABSTRACT

The present invention provides a fixing bracket of a sprinkler for safely fixing and easily mounting and separating a reducer of a sprinkler. The fixing bracket has a body having holes for mounting the reducer, and a pressing lever pressing the bar to bring the bar in contact with the reducer in a space inside the body, in which the body has a pair of walls facing each other and having the holes, respectively, and a bridge connecting the walls, and the pressing lever is turned around a hinge shaft at a first side of the body and presses the bar through an opening formed through the bridge when being turned.

11 Claims, 24 Drawing Sheets

FIXING BRACKET OF SPRINKLER

BACKGROUND OF THE INVENTION

Field of the Invention

The present invention relates to a sprinkler and, more particularly, to a fixing bracket of a sprinkler that can stably fix a reducer of a sprinkler and can be easily attached/detached.

Description of the Related Art

As buildings become larger, sprinklers that can extinguish a fire have to be necessarily installed in these structures. Sprinklers are generally installed on the ceiling and scatter water at high pressure. In order to install sprinklers, a main pipe for supplying water is installed in a ceiling and sprinklers are connected to the main pipe through connection pipes for connecting a plurality of diverging pipes. Flexible tubes that are made of metal are generally used to connect diverging pipes and sprinklers and supply water.

Flexible tubes are spirally corrugated to be flexibly bent and an O-ring and a coupling ring are firmly fixed to the joints with diverging pipes to prevent damage to pipes due to pressure of water that flows at high pressure. One end of a flexible tube is connected to a diverging pipe and the other end is coupled to a connection pipe called a reducer where a sprinkler is fixed. A plurality of fasteners are used to fix reducers, but bolts are used, so the reducer and other parts are damaged by the force for tightening the bolts and bolts are loosened by such damage, and accordingly, fastening force and safety are deteriorated. Further, it is required to loosen and tighten the fasteners in order to unfasten and fasten reducers for replacement, so it is troublesome.

SUMMARY OF THE INVENTION

Accordingly, the present invention has been made keeping in mind the above problems occurring in the related art, and the present invention is intended to propose a fixing bracket of a sprinkler that can safely fix a reducer of a sprinkler and can be easily attached/detached.

In order to achieve the above object, according to one aspect of the present invention, there is provided a fixing bracket of a sprinkler that has a body having holes for mounting the reducer, and a pressing lever pressing a bar to bring the bar in contact with the reducer in a space inside the body, in which the body has a pair of walls facing each other and having the holes, respectively, and a bridge connecting the walls, and the pressing lever is turned around a hinge shaft at a first side of the body and presses the bar through an opening formed through the bridge when being turned.

The hinge shaft may be disposed through the walls or may be disposed through one or more cut portions formed by cutting the bridge to be exposed to the outside.

The pressing lever may have a first contact portion and a second contact portion that are selectively brought in contact with the bar when the pressing lever is turned, and the distances between the first contact portion and the hinge shaft and between the second contact portion and the hinge shaft may be different.

The pressing lever may have a contact side that comes in contact with the bar and the contact side may change in distance from the hinge shaft, depending on positions.

According to another aspect of the present invention, there is provided a fixing bracket of a sprinkler that has a body having holes for mounting the reducer, and a coupling assembly coupled to the body and turned around a hinge shaft at a first side of the body to open or close the holes, in which the body has a pair of walls facing each other and having the holes, respectively, and fastening grooves formed at first sides of the walls, and the coupling assembly includes a cover member, a fastening member rotatably coupled to the cover member and inserted in the fastening grooves, and an elastic member providing rotational force to the coupling assembly when the holes are opened.

The cover member may have a pair of cover sides, first coupling holes formed at the first sides of the cover sides to couple the body, and second coupling holes formed at second sides of the cover sides to couple the fastening member.

The fastening member may have a pair of fastening sides, coupling holes formed at the fastening sides to couple the cover member, and a fastener inserted in the fastening grooves.

The elastic member may be a leaf spring disposed inside the coupling assembly or may be a toggle spring disposed inside the body and the coupling assembly.

The coupling assembly may further include a fastening-elastic member pressing the fastening member to maintain the fastening member in the fastening grooves, and the fastening-elastic member may be a leaf spring disposed outside the fastening member or may be a toggle spring disposed inside the cover member and the coupling assembly. The fastening-fixing member may be integrated with the elastic member.

According to the present invention, since a reducer is fixed not by bolts, but in a one-touch manner, the reducer can be easily and simply fixed and separated and the fastening force can be increased. Further, there is no need for a specific tool for fixing and separating a reducer and the problem due to separation and loss of bolts can be prevented.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, sprinklers according to various embodiments of the present invention are described in detail with reference to the accompanying drawings.

Figure 1:
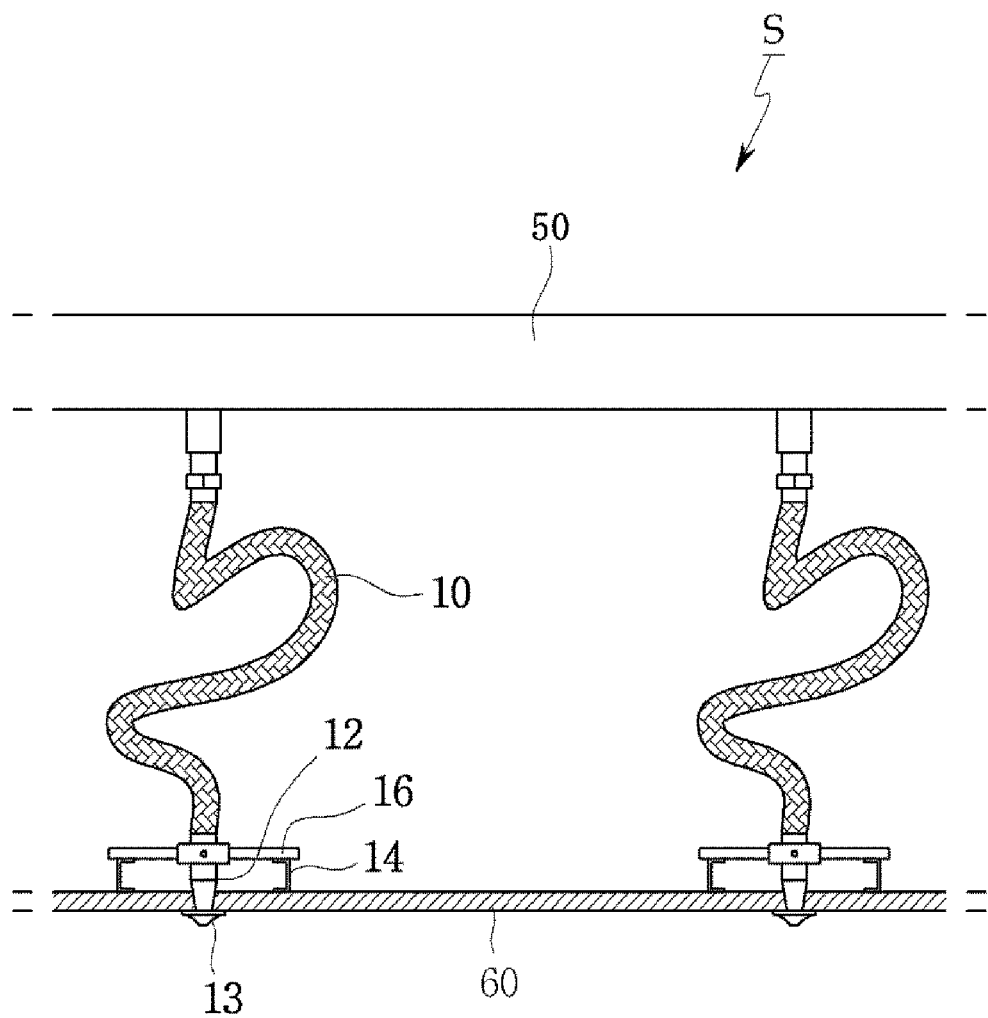
FIG. 1 is a view showing an installation structure of a sprinkler system.

FIG. 1 is a view showing an example of installing a sprinkler system.

In a sprinkler system S shown in FIG. 1, flexible pipes 10 diverging from a main pipe 50 for supplying fire-extinguishing water and reducers 12 are connected to the lower ends of the flexible pipes 10. Heads 13 are coupled to the lower end of the reducers 12 and fitted in holes formed through ceiling tiles 60. The flexible pipe 10, reducer 12, and head 13 are referred to as a sprinkler joint when combined.

Figure 2:
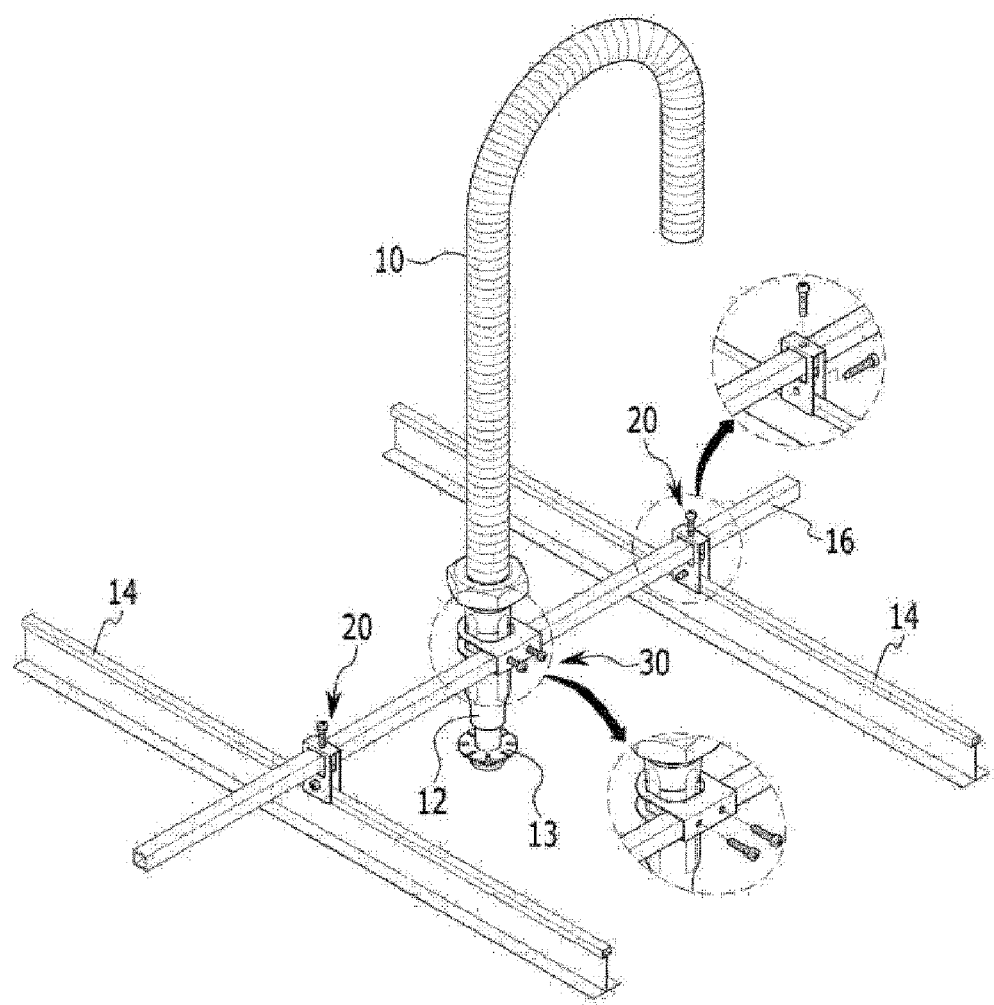
FIG. 2 is a view showing in detail the sprinkler system shown in FIG. 1.

FIG. 2 is a view showing in detail the sprinkler system shown in FIG. 1.

As shown in FIG. 2, in the sprinkler system, a bar, preferably, a rectangular bar 16 is disposed across a pair of channels 14 arranged with a predetermined gap and is fastened to the channels 14 by side brackets 20 fixed by bolts, and a reducer-fixing bracket 30 is fastened to the rectangular bar 16 by bolts to fix the reducer 12, the flexible tube 10, and the sprinkler head 13.

When the side bracket 20 is fastened to the channel 14 only by bolts, the bolts are in direct contact with the channel 14, but the contact area between the bolts and the channel 14 is small, so the fastening force may not be sufficient. Further, a user needs tools for tightening and loosening the bolts and he/she may lose the bolts upon adjustment, so installation may be inconvenient.

Similarly, when the reducer 12 is fixed only by bolts through the reducer-fixing bracket 30, the bolts are in direct contact with the rectangular bar 16, but the contact area between the bolts and the rectangular bar 16 is small, so the fastening force may not be sufficient.

Another example of a reducer-fixing bracket for solving these defects is described.

Figure 3:
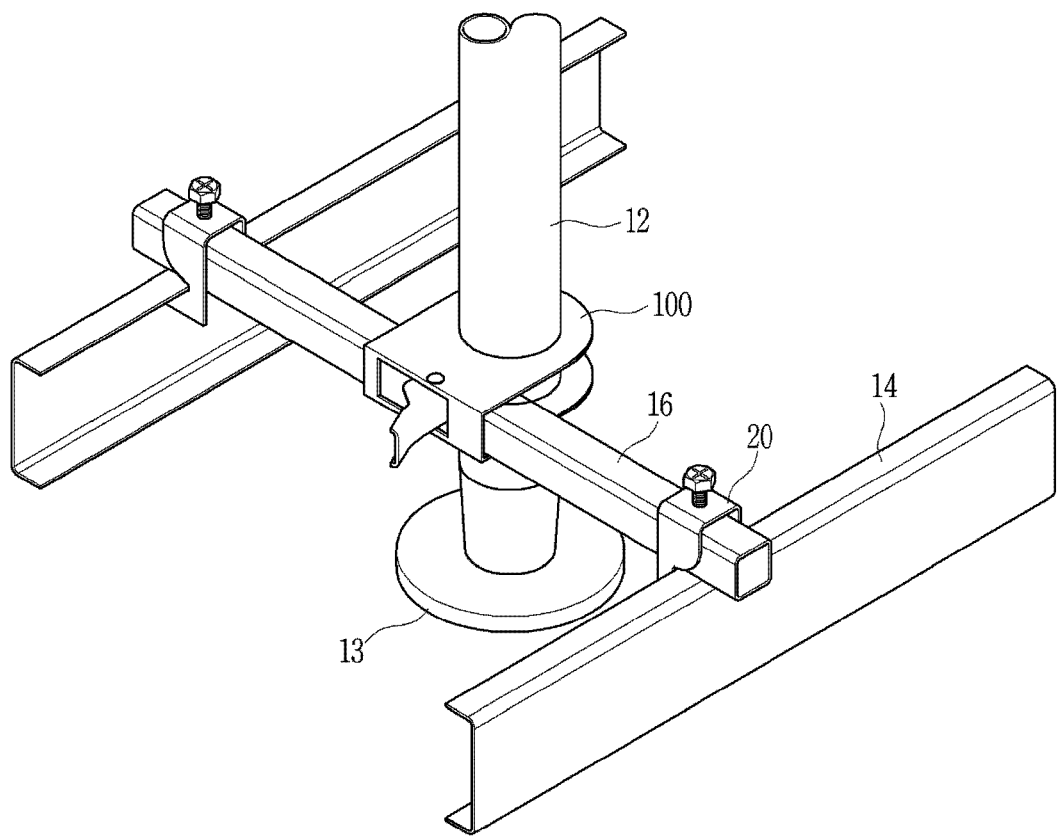
FIG. 3 is a perspective view showing a reducer-fixing bracket according to a first embodiment of the present invention.
Figure 4:
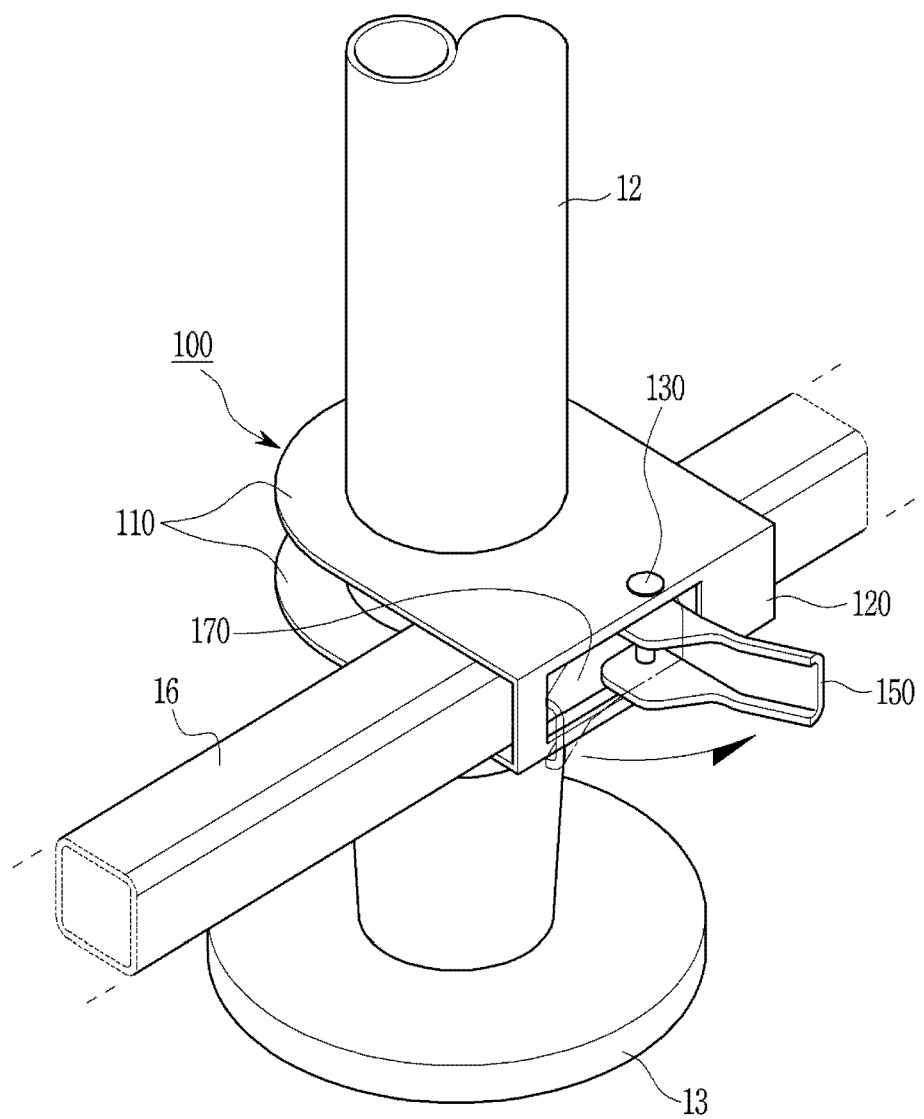
FIG. 4 is an enlarged perspective view of a fixing bracket 100 shown in FIG. 3.

FIGS. 3 and 4 are perspective views showing a reducer-fixing bracket according to a first embodiment of the present invention.

As shown in FIG. 4, a reducer-fixing bracket 100 according to the first embodiment of the present invention has a body 100+120 formed by cutting and bending an iron plate and a pressing lever 150.

The body 110+120 has a pair of walls 110 facing each other with a predetermined gap therebetween, holes 113 for inserting the reducer 12, and a bridge 120 connecting the walls 110. The holes 113 are formed through the walls 110 to insert the reducer 12 through the walls 110, and have a size depending on the diameter of the reducer 12 to be able to fix the reducer 12, and may correspond to the shape of the reducer 12. Further, the bridge 120 connects sides of the walls 110, perpendicular to the walls 110.

A hinge shaft 130 is disposed through the walls 110, in predetermined areas of the walls 110 close to the bridge 120. An opening 170 is formed through the bridge 120 so that the pressing lever 150 can be turned around the hinge shaft 130.

A space where the reducer 12 and the bar 16 can cross each other at a right angle is defined inside the body 110+120 and the bar 16 is pressed in contact with the reducer 12 when the pressing lever 150 is turned.

Figure 5:
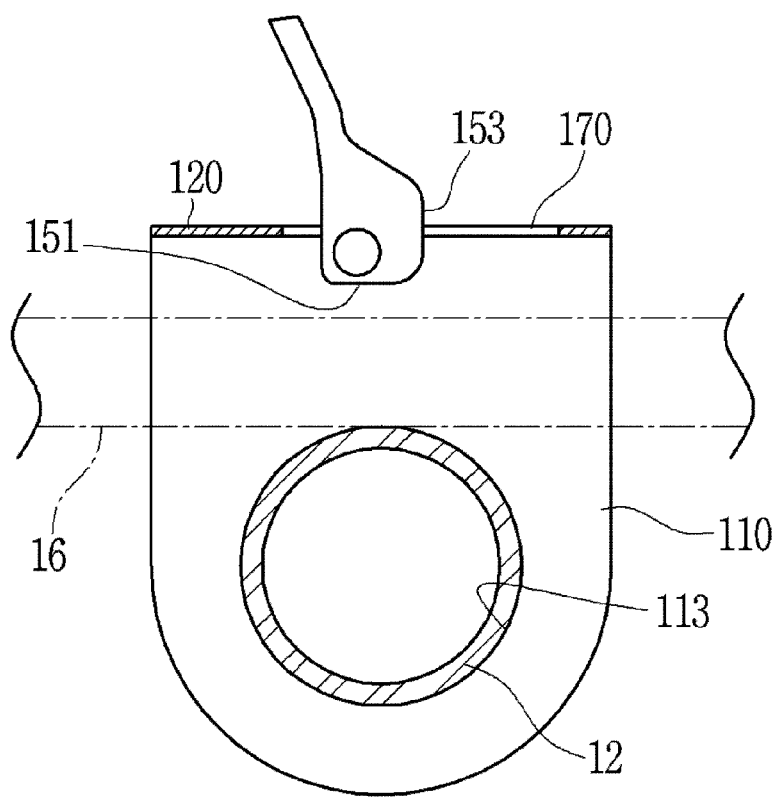
FIGS. 5 and 6 are cross-sectional views of the fixing bracket 400 shown in FIG. 4.
Figure 6:
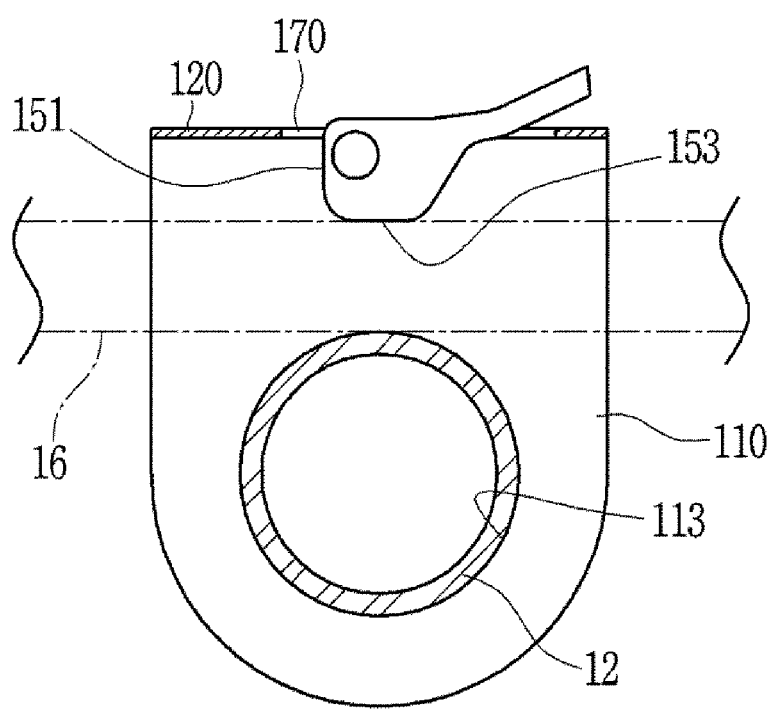

The pressing lever 150 presses the bar 16 through the opening 170 to bring the bar 16 in contact with the reducer 12 in the space of the body 110+120 and has a first contact portion 151 and a second contact portion 153 that selectively face or come in contact with the bar 16 when the pressing lever 150 is turned around the hinge shaft 130, as shown in FIGS. 5 and 6. The distances between the first contact portion 151 and the hinge shaft 130 and between the second contact portion 153 and the hinge shaft 130 are made different.

The first contact portion 151 and the second contact portion 153 are arranged adjacent to each other and make a predetermined angle (preferably, 90 degrees) to each other, and the edge between the first and second contact portions 151 and 153 is rounded to allow the pressing lever 150 to be easily turned.

Operation of the reducer-fixing bracket 100 according to the first embodiment of the present invention is described hereafter.

FIG. 5 is a view before the fixing bracket 100 and the reducer 12 are coupled, as in FIG. 4, and FIG. 6 is a view after the fixing bracket and the reducer are coupled.

As shown in FIG. 5, in order to couple the reducer 12 to the fixing bracket 100, first, the reducer 12 is inserted into the holes 113 of the fixing bracket 100, with the first contact portion 151 facing the inside of the body 110+120, and then the bar 16 is put into the body 110+120 at a side of the reducer 12. The bar 16 is positioned between the reducer 12 and the pressing lever 150.

Thereafter, as shown in FIG. 6, a user (or a worker) holds the grip of the pressing lever 150 and turns it such that the second contact portion 153 presses the bar 16. Accordingly, the gap between the reducer 12 and the bar 16 is reduced and the bar 16 presses the reducer 12. Accordingly, the bar 16 and the reducer 12 can be firmly fixed inside the fixing bracket 100.

As described above, as the reducer 12 is fixed in a one-touch manner by the fixing bracket 100, it is possible to easily fix and separate and more firmly fix the reducer 12. Further, it is possible to fix and separate the reducer 12 even without a specific tool.

Figure 7:
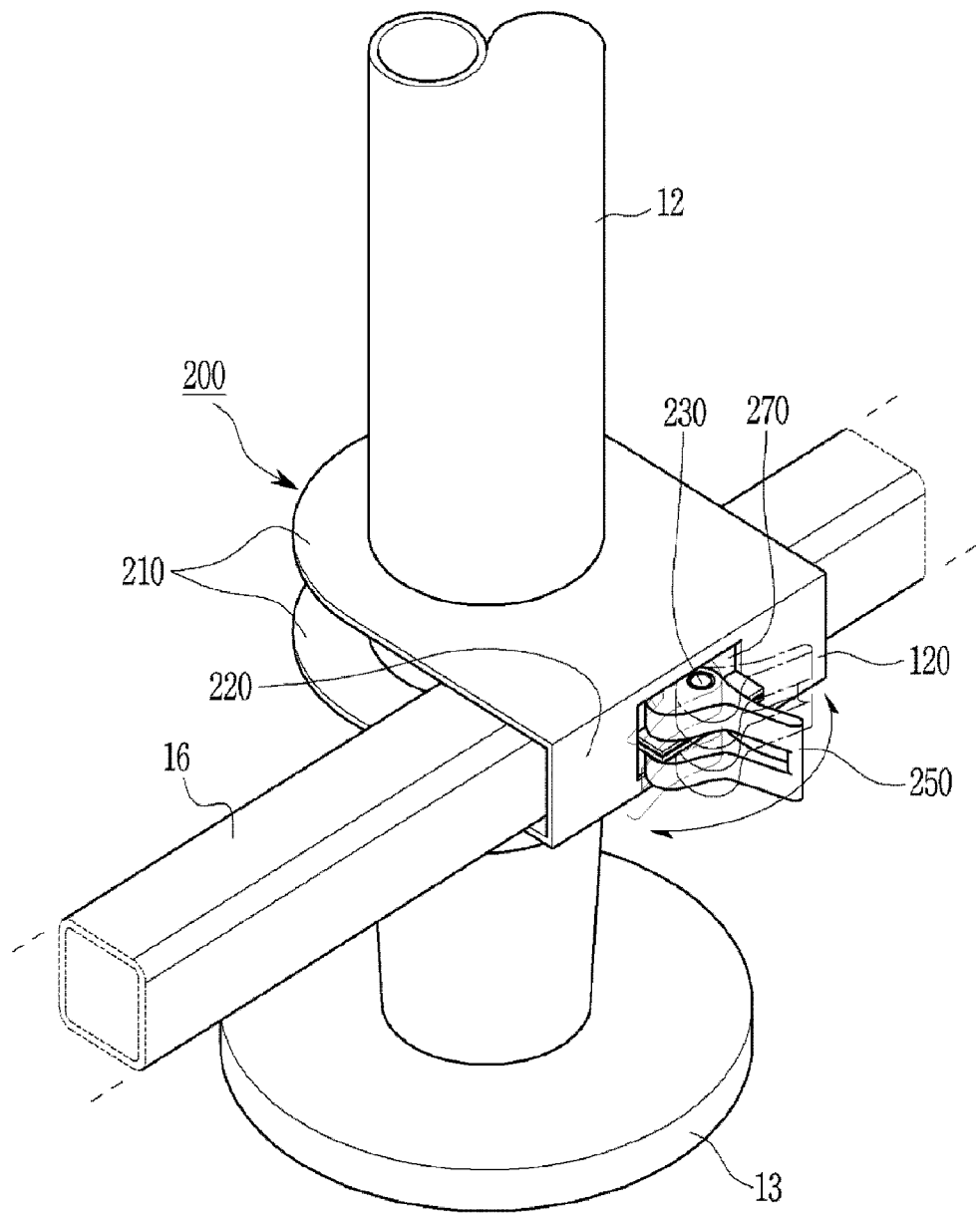
FIG. 7 is a perspective view showing a reducer-fixing bracket according to a second embodiment of the present invention.

FIG. 7 is a perspective view showing a reducer-fixing bracket according to a second embodiment of the present invention.

As shown in FIG. 7, a reducer-fixing bracket 200 according to the second embodiment of the present invention has a body 210+220 formed by cutting and bending an iron plate and a pressing lever 250.

The body 210+220 has a pair of walls 210 facing each other with a predetermined gap therebetween, holes 213 for inserting the reducer 12, and a bridge 220 connecting the walls 210. The holes 213 are formed through the walls 210 to insert the reducer 12 through the walls 210, and have a size depending on the diameter of the reducer 12 to be able to fix the reducer 12, and may correspond to the shape of the reducer 12. Further, the bridge 220 connects sides of the walls 210, perpendicular to the walls 210.

The bridge 220 has an opening 270 and one or more cut portion 280 by cutting and bending predetermined portions.

The cut portion 280 is exposed out of the body, and as shown in FIG. 7, two cut portions 280 may be parallel with each other and perpendicular to the bridge 120. Although two cut portions 280 are inserted in the pressing lever 250 in FIG. 7, the cut portions 280 may be disposed outside, for example, at both sides of the pressing lever 250.

Further, a hinge shaft 230 is disposed through the cut portions 280. The opening 270 allows the pressing lever 250 to press the bar 16 by turning around the hinge shaft 230.

A space where the reducer 12 and the bar 16 can cross each other at a right angle is defined inside the body 210+220 and the bar 16 is pressed in contact with the reducer 12 when the pressing lever 150 is turned.

Figure 8:
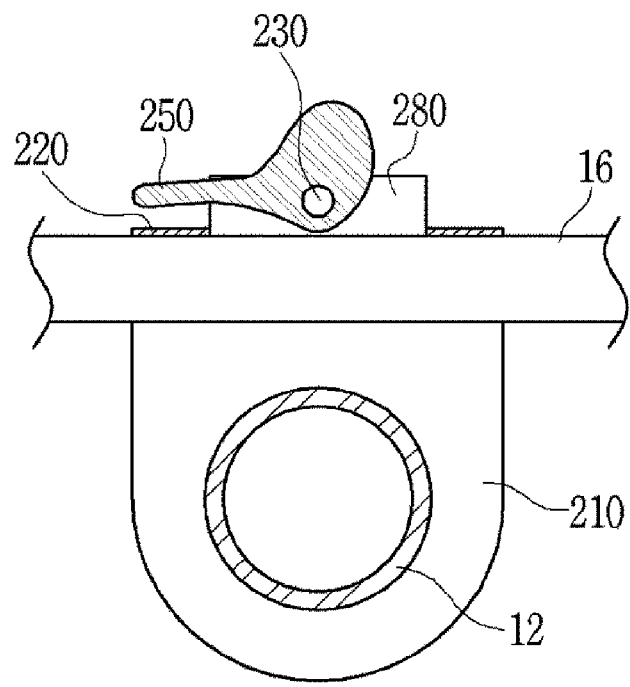
FIGS. 8 to 10 are cross-sectional views of the fixing bracket 200 shown in FIG. 7.
Figure 9:
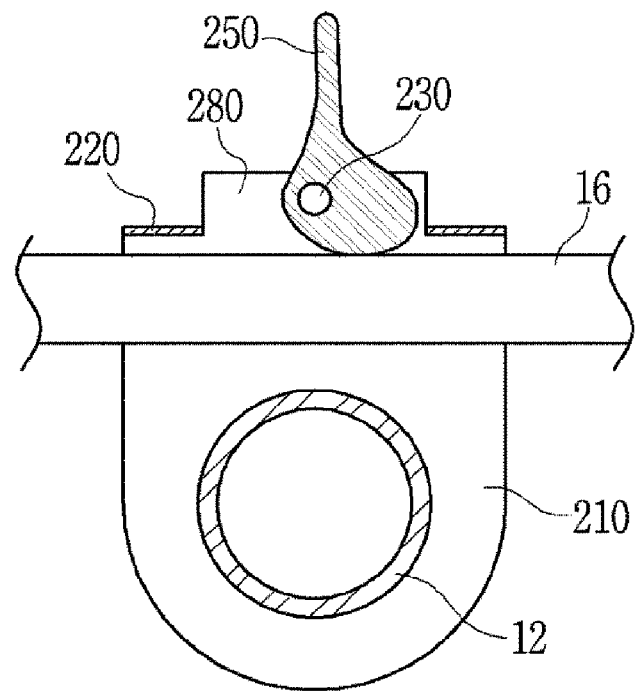
Figure 10:
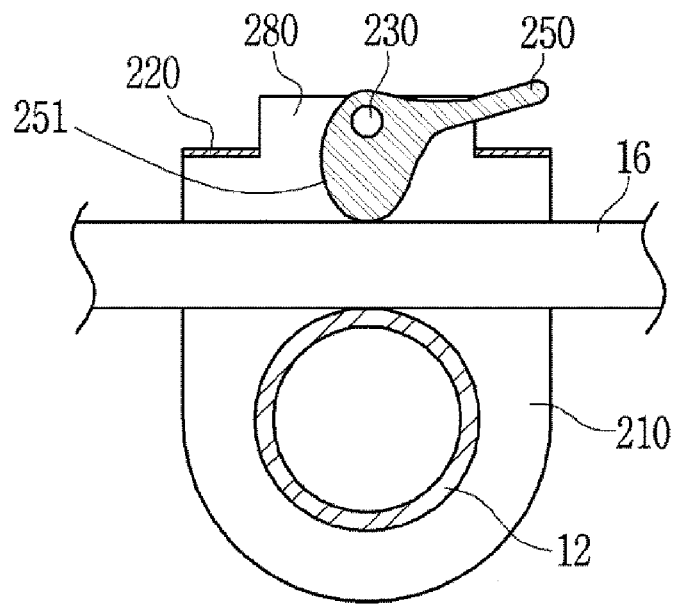
Figure 11:
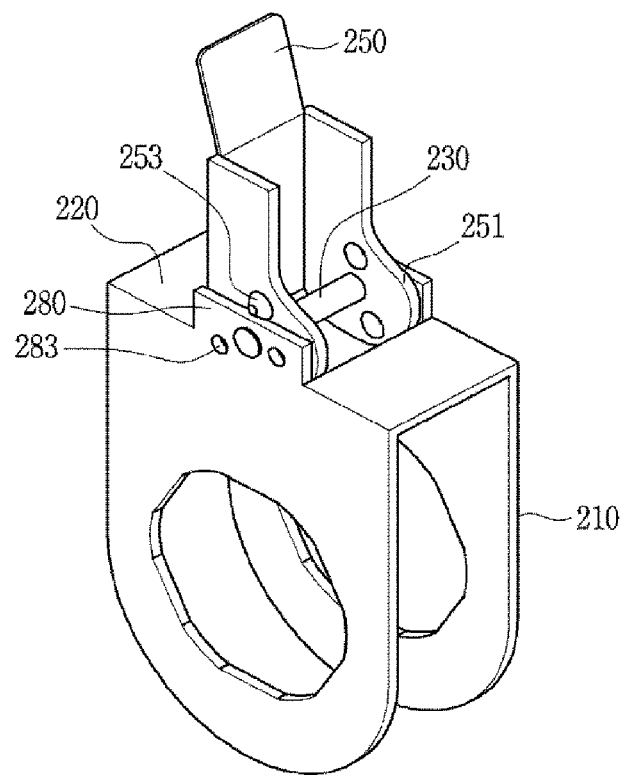
FIGS. 11 and 12 are perspective views showing a reducer-fixing bracket 200 according to a third embodiment of the present invention.

The pressing lever 250 presses the bar 16 through the opening 270 to bring the bar 16 in contact with the reducer 12 in the space of the body 210+220 and has a contact side that can change the position of the bar 16 when the pressing lever 150 is turned around the hinge shaft 230, as shown in FIGS. 8 to 10. The contact side changes the distance from the hinge shaft 230, depending on its position. Further, the contact side 251 may be curved so that the pressing lever 250 can be easily turned.

Operation of the reducer-fixing bracket 200 according to the second embodiment of the present invention is described hereafter.

FIGS. 8 and 9 are views before the fixing bracket 200 and the reducer 12 of FIG. 7 are coupled and FIG. 10 is a view after the fixing bracket and the reducer are coupled.

As shown in FIG. 8, in order to couple the reducer 12 to the fixing bracket 200, first, the reducer 12 is inserted into the holes 213 of the fixing bracket 200, without the contact side 251 inserted in the body 210+220, and then the bar 16 is put into the body 210+220 at a side of the reducer 12. The bar 16 is positioned between the reducer 12 and the pressing lever 250.

Thereafter, as shown in FIG. 9, a user (or a worker) holds the grip of the pressing lever 250 and turns it such that the contact side 251 presses the bar 16. Accordingly, the bar 16 is moved closer to the reducer 12.

Further, as shown in FIG. 10, when the pressing lever 250 is further turned, the gap between the bar 16 and the reducer 12 is further reduced and the bar 16 presses the reducer 12. Accordingly, the bar 16 and the reducer 12 can be firmly fixed inside the fixing bracket 200.

FIGS. 11 to 14 are perspective views showing a reducer-fixing bracket according to a third embodiment of the present invention.

The reducer-fixing bracket 200 shown in FIGS. 11 to 14 is similar to the reducer-fixing bracket shown in FIG. 7, but further has one or more projections 253 formed on the sides of the pressing bar 250 and one or more holes 283 formed through the cut portions 280. Although two projections 253 and two holes 283 are shown in the figures, the numbers are not limited thereto.

Figure 12:
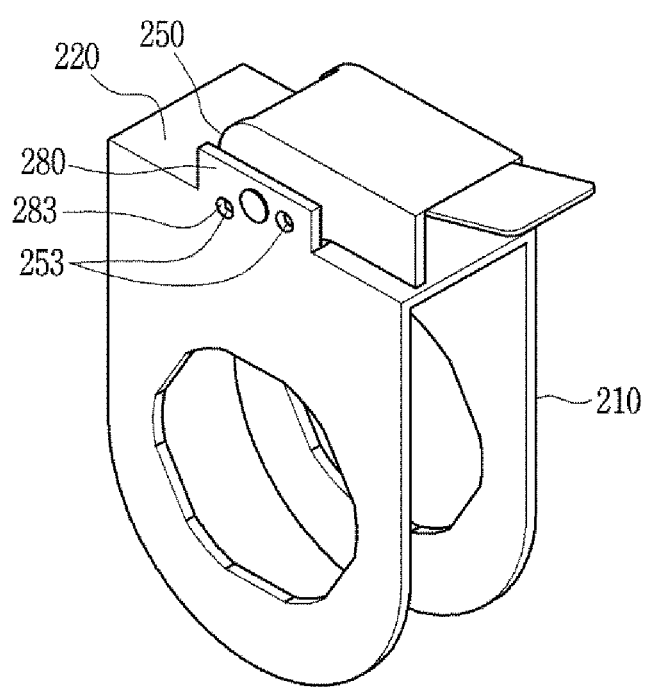
Figure 13:
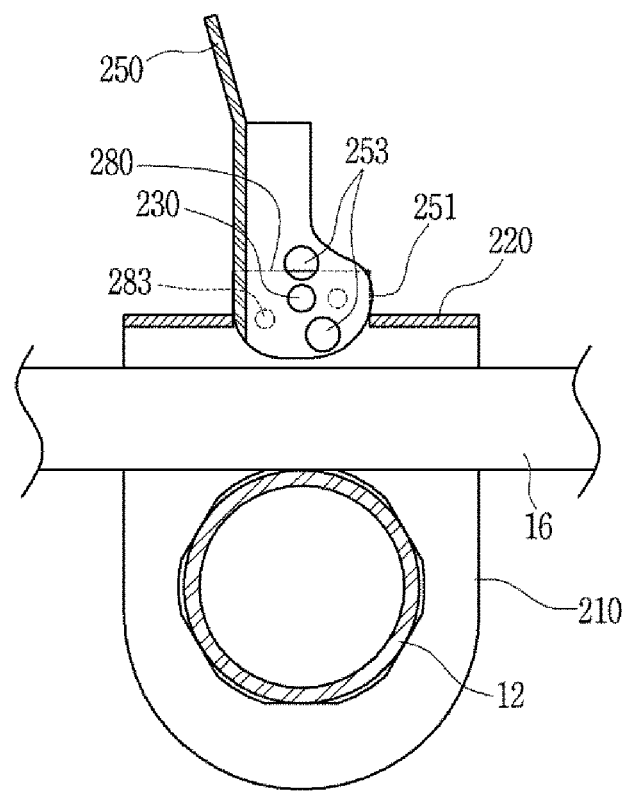
FIGS. 13 and 14 are cross-sectional views showing the fixing bracket shown in FIGS. 11 and 12.
Figure 14:
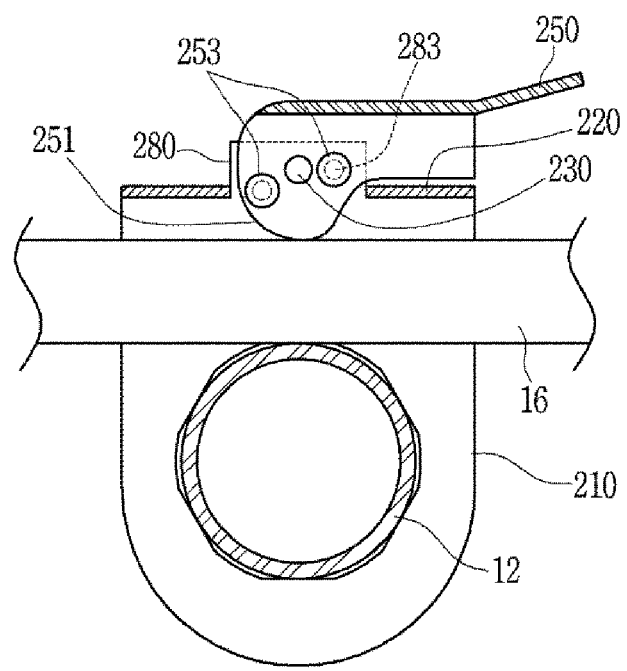

The projections 253 are formed on the sides of the pressing lever 250 that are in contact with the cutting portions 280, and as shown in FIGS. 12 to 14, when the pressing lever 250 is turned to press the bar 16, the projections 253 are inserted into corresponding holes 283. When the projections 253 are inserted in the holes 283, the pressing lever 250 can be fixed not to freely turn.

Further, as shown in FIGS. 11 to 14, a grip 250 bending at a predetermined angle may be formed at the end of the pressing lever 250 for a user to easily operate the pressing lever 250.

As described above, as the reducer 12 is fixed in a one-touch manner by the fixing bracket 200, it is possible to easily fix and separate and more firmly fix the reducer 12. Further, it is possible to fix and separate the reducer 12 even without a specific tool.

Figure 15:
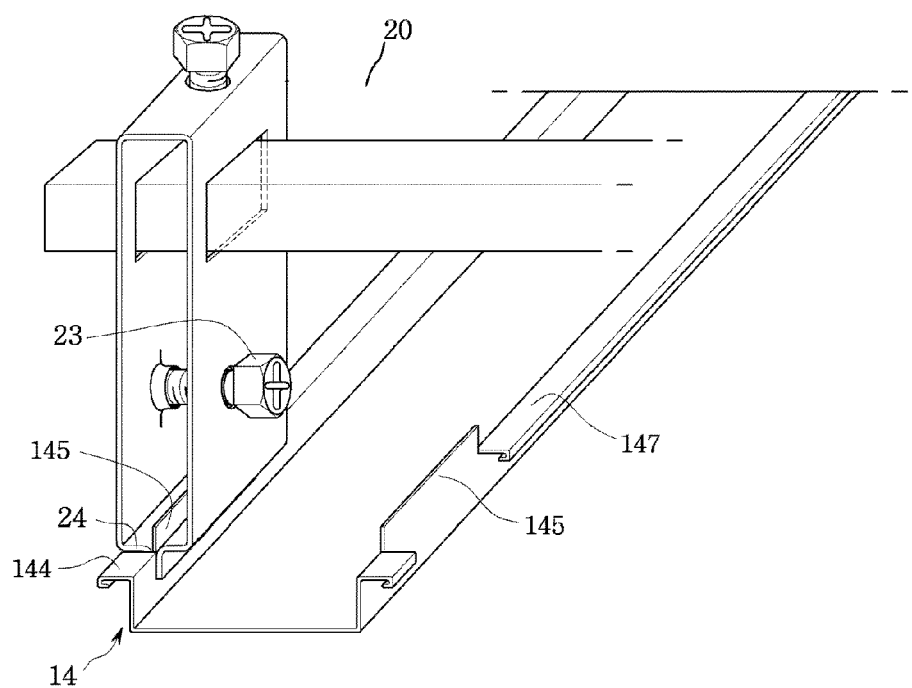
FIG. 15 is a perspective view showing an example of a side bracket 20.

FIG. 15 is a perspective view showing an example of a side bracket 20, in which a joint of a sprinkler is fixed.

As shown in FIG. 15, wings 145 are formed by cutting portions of flanges 144 of the channel 14 and vertically bending the portions.

A step 24 is formed by inwardly bending the lower portion of the side bracket 20 to be coupled to the wing 145 and a bolt 23 is disposed through both sides of the side bracket 20. Accordingly, the step 24 of the side bracket 20 is fastened and fixed to the wing 145 of the channel 14 by the bolt 23.

Figure 16:
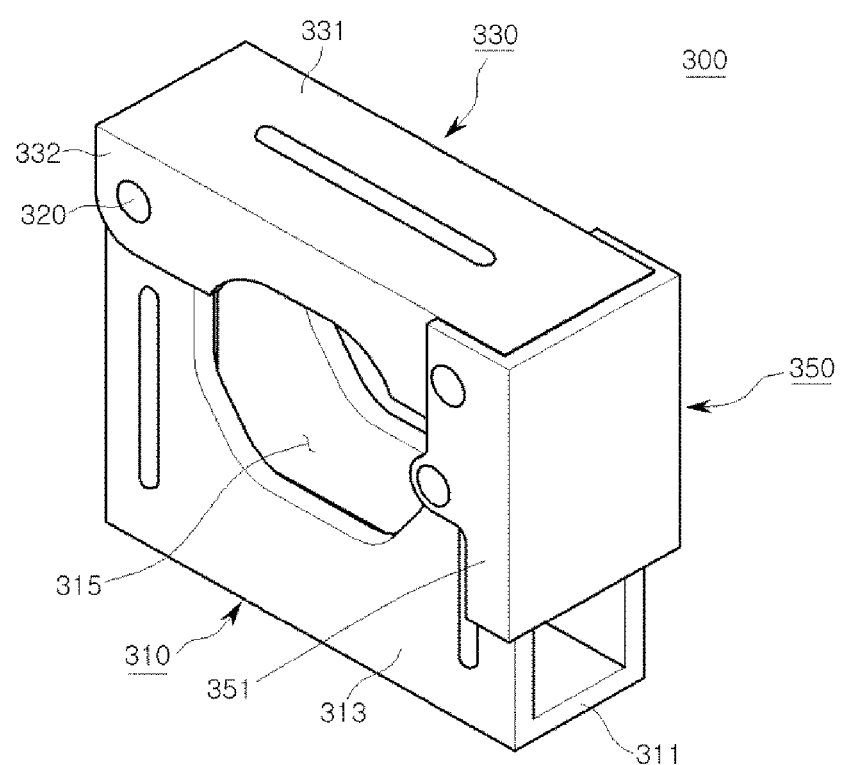
FIGS. 16 to 18 are perspective views showing a reducer-fixing bracket according to a fourth embodiment of the present invention.
Figure 17:
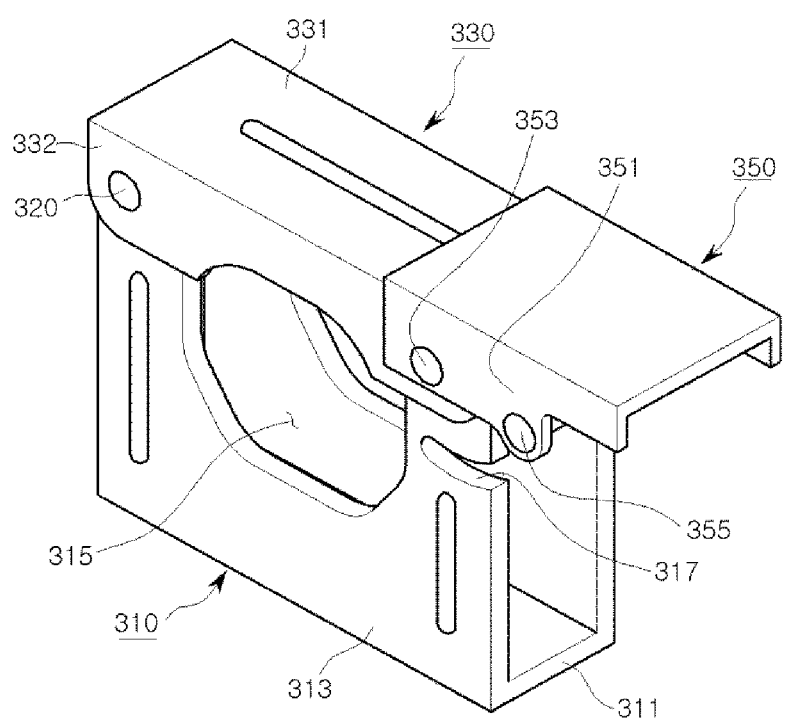
Figure 18:
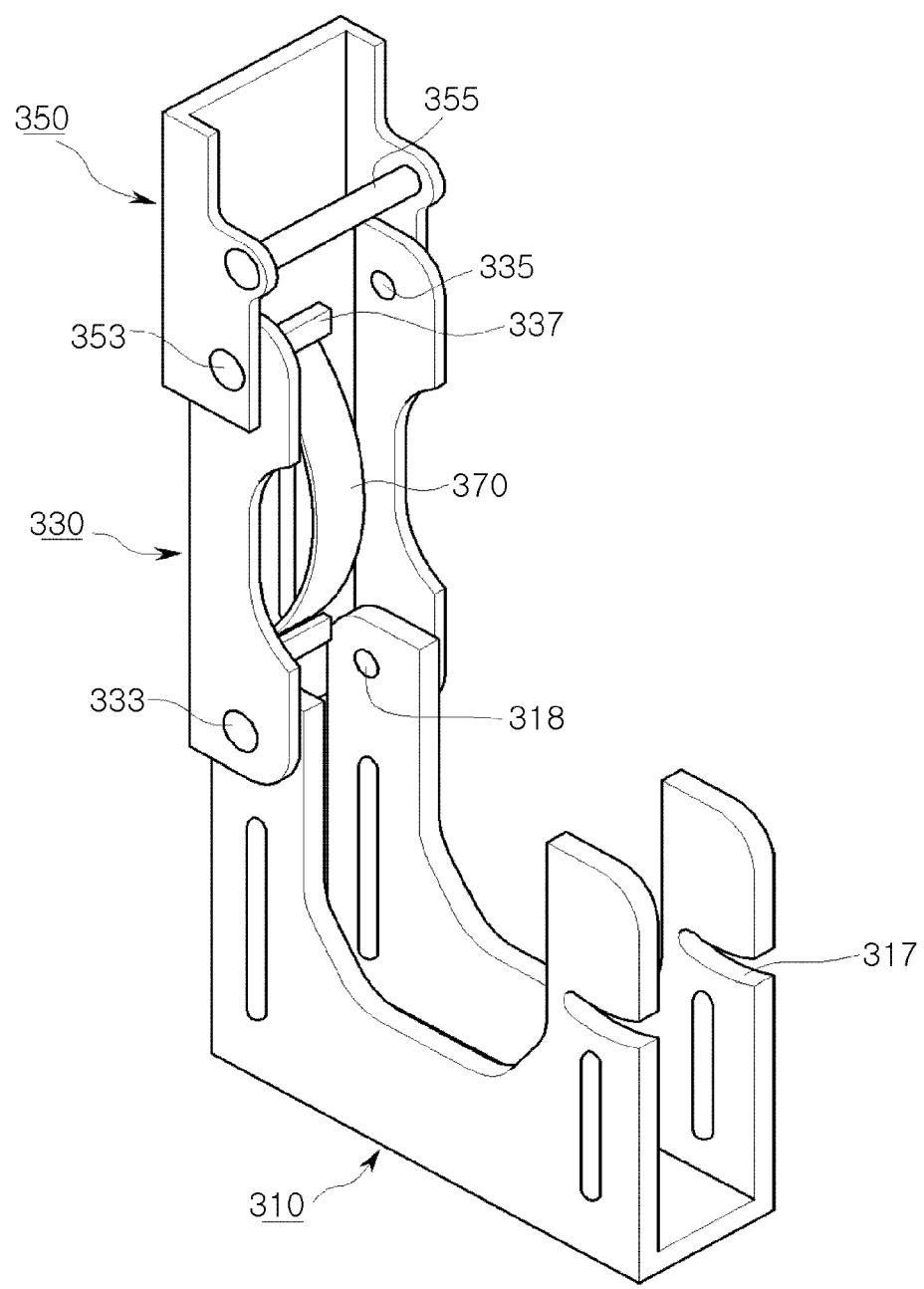
Figure 19:
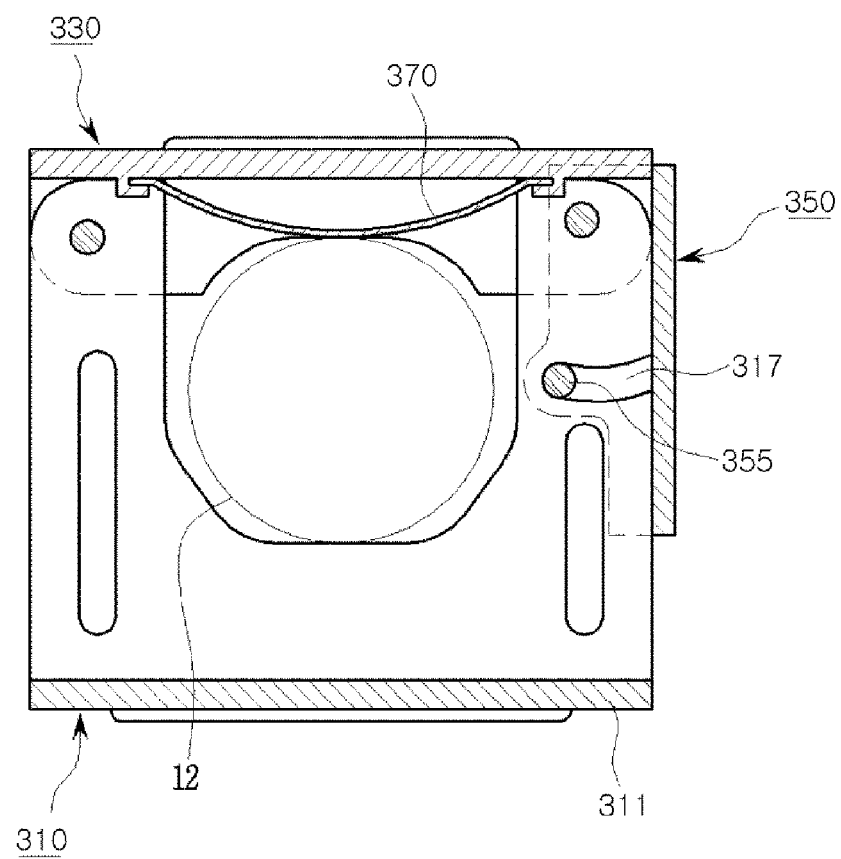
FIGS. 19 to 21 are cross-sectional views of the reducer-fixing bracket 300 shown in FIGS. 16 to 18.
Figure 20:
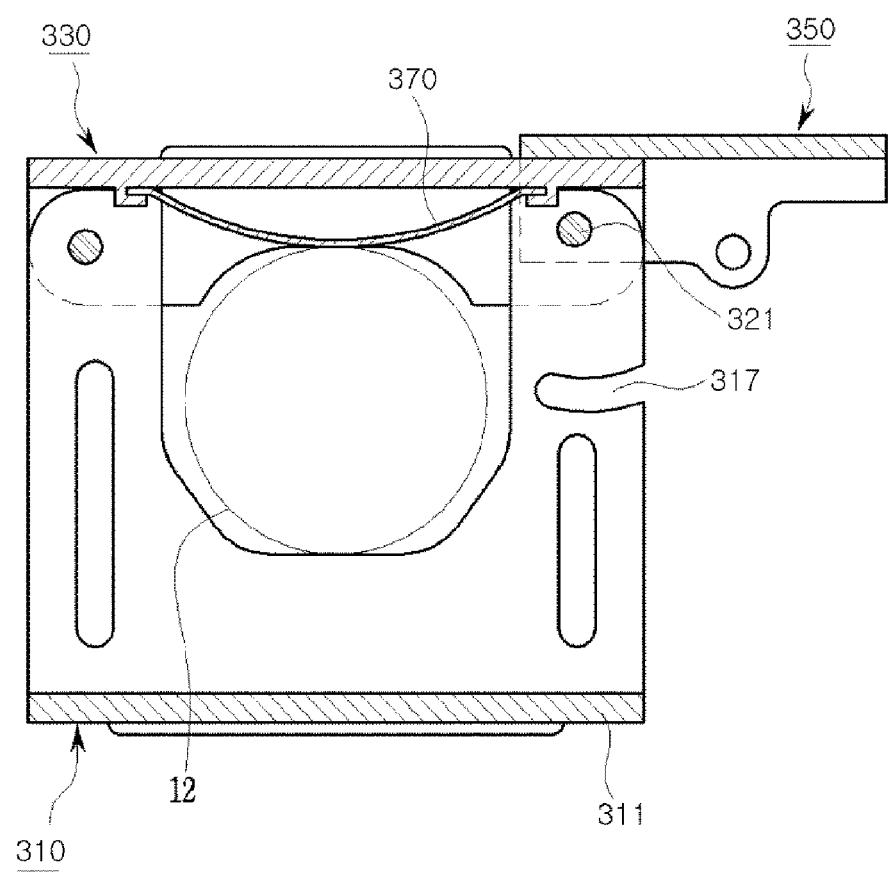
Figure 21:
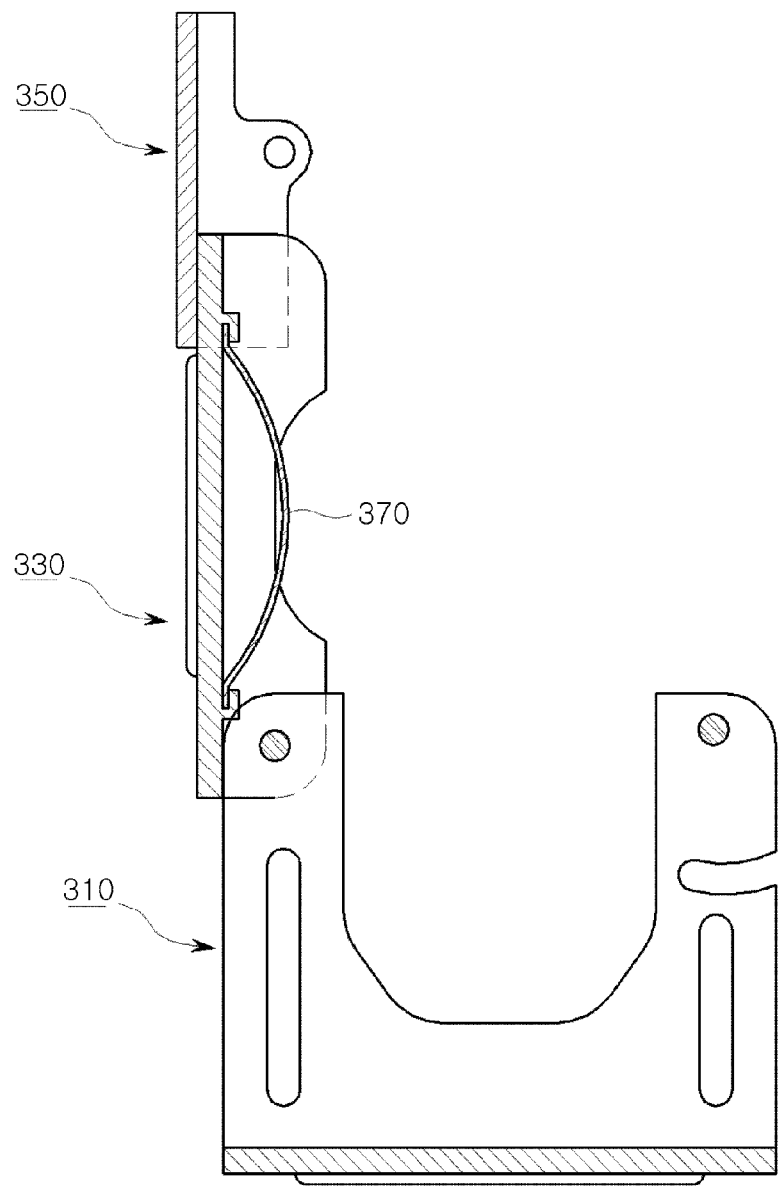

FIGS. 16 to 18 are perspective views showing a reducer-fixing bracket according to a fourth embodiment of the present invention and FIGS. 19 to 21 are cross-sectional views corresponding to FIGS. 16 to 18, respectively.

As shown in FIGS. 16 and 17, a reducer-fixing bracket 300 according to the fourth embodiment of the present invention has a body 310 formed by cutting and bending an iron plate and a coupling assembly 330+350.

The body 310 has a bottom 311 having a predetermined width and a pair of walls 313 facing each other at both sides of the bottom 311. Holes 315 are formed through the center portion of the walls 313 to insert the reducer 12.

The holes 315 have a size depending on the diameter of the reducer 12 to be able to fix the reducer and may correspond to the shape of the reducer 12.

Coupling grooves 317 are formed at an angle at a first side of the body 310 and hinge holes 318 are formed at a second side of the body 310 so that a cover member 330 is coupled through a hinge shaft 320. Accordingly, when the reducer 12 is inserted into the holes 315 and the fastening member 350 is fastened to the body 310, the reducer 12 is fixed at the inserted position.

As shown in FIG. 18, the coupling assembly 330+350 is coupled to the body 310 and turned around the hinge shaft 320 at the first side of the body 310 to open/close the holes 315.

The coupling assembly 330+350 includes the cover member 330, the fastening member 350 rotatably connected to the cover member 330 and inserted in the coupling grooves 317, and an elastic member 370 that provides a rotational force to the coupling assembly 330+350 when the holes 315 are opened.

The cover member 330 has a top 331 and a pair of cover sides 332, first coupling holes 333 for coupling the body 310 are formed at first sides, that is, front end portions of the cover sides 332, and second coupling holes 335 for coupling the fastening member 350 are formed at second sides of the cover sides 332. The first coupling holes 333 are formed at positions corresponding to the hinge holes 318 so that the body 310 and the cover member 330 are coupled by a pin.

The fastening member 350 has a pair of fastening sides 351, coupling holes 353 formed at the fastening sides 351 to couple the cover member 330, and a fastener 355 that is inserted in the fastening holes 317. The coupling holes 353 are formed at positions corresponding to the second coupling holes 335 so that the cover member 330 and the fastening member 350 are coupled by a pin. Further, though not shown in the figures, a grip may be provided at the front end or rear end of the fastening member 350 for a user to operate the fastening member 350.

The elastic member 370 provides rotational force to the cover member 330 so that the cover member 330 is opened when the reducer 12 is inserted into or taken out of the holes 315. The elastic member 370 may be a leaf spring that is disposed inside the coupling assembly 330+350, particularly, inside the cover member 330, as shown in FIG. 18. In particular, when the elastic member 370 is a leaf spring, the leaf spring is fixed by two stoppers 337 at both ends such that it convexly bends toward the holes 315 and can press the reducer 12 so that the reducer 12 is strongly fixed in the holes 315.

Operation of the reducer-fixing bracket 300 according to the fourth embodiment of the present invention is described hereafter.

FIG. 19 is a cross-sectional view when the fixing bracket 300 and the reducer 12 are coupled, FIG. 20 is a cross-sectional view when the fastening member 350 is open, and FIG. 21 is a cross-sectional view when the cover member 330 is open.

In order to couple the reducer 12 to the fixing bracket 300, the reducer 12 is placed in the holes 315 and then the bar 16 is put inside the body 330+350 at a side of the reducer 12. The bar 16 is positioned between the reducer 12 and the bottom 311.

Thereafter, as shown in FIG. 19, a user (or a worker) turns the fastening member 350 so that the fastener 355 is inserted into the fastening grooves 317. When the elastic member 370 is a leaf spring, the elastic member 370 presses the reducer 12. Accordingly, the reducer 12 can be firmly fixed. Force that opens the cover member 330 is maintained by repulsive force/elasticity of the elastic member 370 against the reducer 12, with the fastener 355 inserted in the fastening grooves 317.

In contrast, in order to separate the reducer 12 from the fixing bracket 300, as shown in FIG. 20, when a worker opens the fastening member 350 by turning it around the hinge shaft 321, rotational force is applied to the cover member 330 by the repulsive force/elasticity of the elastic member 370.

Accordingly, the cover member 300 is turned around the hinge shaft 320 by the rotational force even without another external force, and accordingly, the cover member 330 is opened to open the holes 315, as shown in FIG. 21.

As described above, since it is possible to open/close the cover member 330 only with the force that turns the fastening member 350, it is possible to easily couple and separate the reducer 120 and provide a larger fastening force. Further, it is possible to fix and separate the reducer 12 even without a specific tool.

Figure 22:
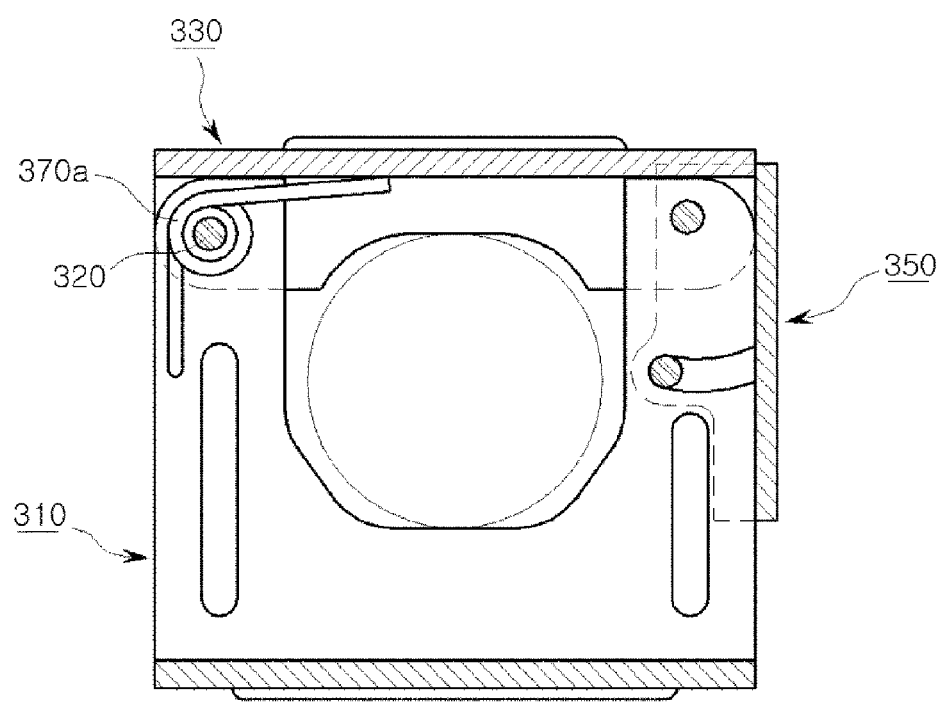
FIG. 22 is a cross-sectional view showing a fifth embodiment modified from the reducer-fixing bracket 300 according to the present invention.

FIG. 22 is a cross-sectional view showing a fifth embodiment modified from the reducer-fixing bracket 300 according to the present invention;

The reducer-fixing bracket 300 shown in FIG. 22 is similar in configuration and operation to the reducer-fixing bracket 300 shown in FIGS. 16 to 21, but is different in that there is provided an elastic member 370a that is a toggle spring.

When the elastic member 370a is a toggle spring, the toggle spring is fixed by a hinge shaft 320 and stretches toward the body 310 and the coupling assembly 330+350.

Figure 23:
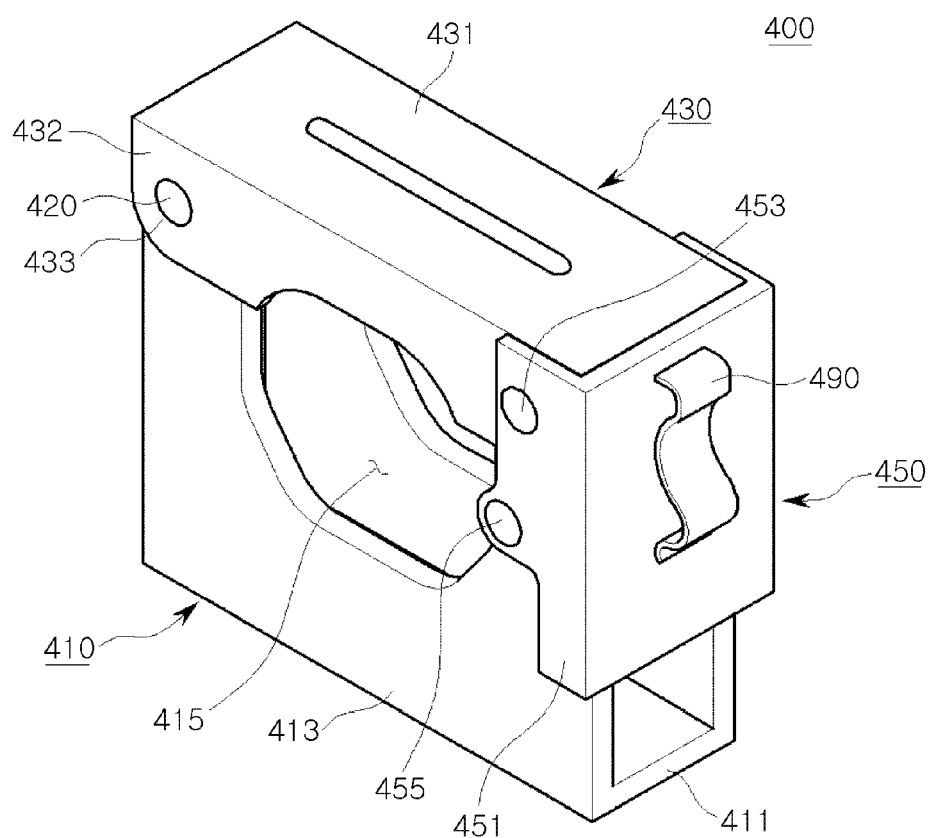
FIGS. 23 to 24 are perspective views showing a reducer-fixing bracket according to a sixth embodiment of the present invention.
Figure 24:
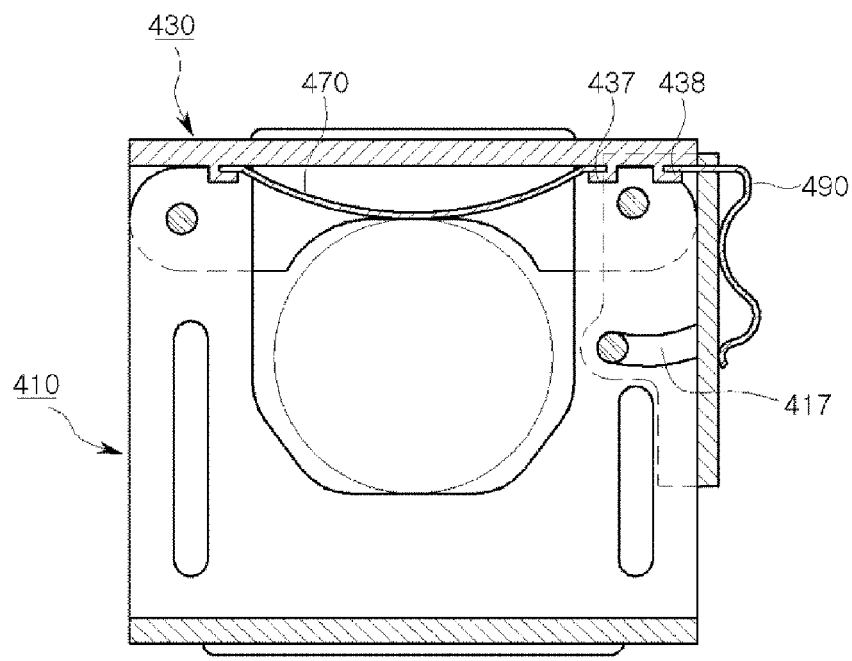
Figure 25:
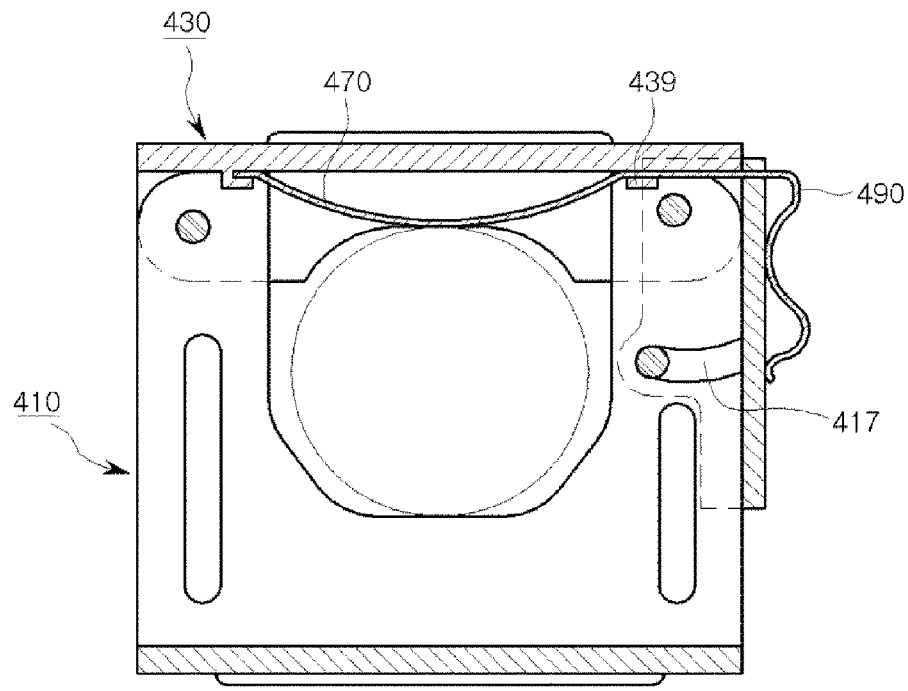
FIGS. 25 to 27 are cross-sectional views showing a seventh embodiment modified from the reducer-fixing bracket 400 according to the present invention.
Figure 26:
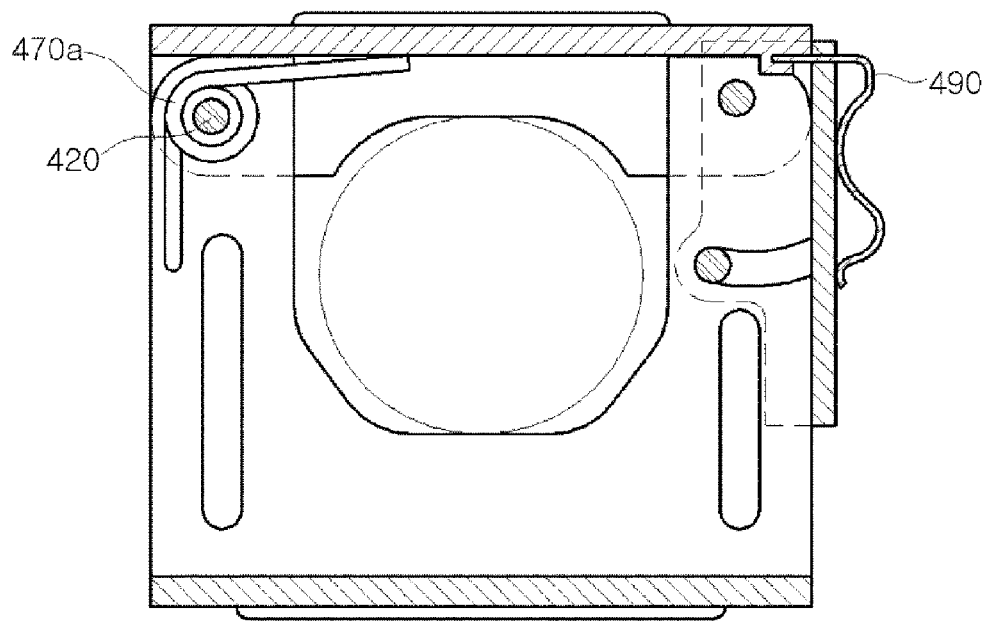
Figure 27:
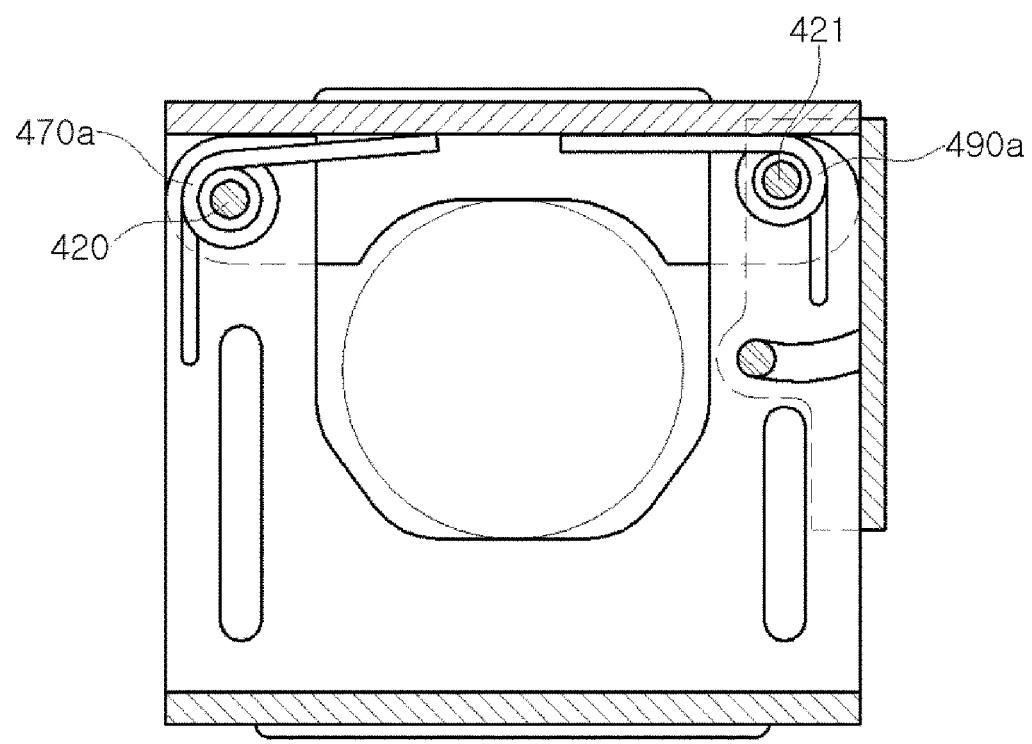

FIGS. 23 and 24 are views showing a reducer-fixing bracket according to a sixth embodiment of the present invention and FIGS. 25 to 27 are cross-sectional views showing a reducer-fixing bracket 400 according to a seventh embodiment of the present invention.

As shown in FIG. 23, the reducer-fixing bracket 400 according to the sixth embodiment of the present invention has a body 410 formed by cutting and bending an iron plate and a coupling assembly 430+450.

The body 410 has a bottom 411 having a predetermined width and a pair of walls 411 facing each other at both sides of the bottom 413. Holes 413 are formed through the center portion of the walls 415 to insert the reducer 12.

The holes 415 have a size depending on the diameter of the reducer 12 to be able to fix the reducer and may correspond to the shape of the reducer 12.

Coupling grooves 417 are formed at an angle at a first side of the body 410 and hinge holes are formed at a second side of the body 410 so that a cover member 430 is coupled through the hinge shaft 420. Accordingly, when the reducer 12 is inserted into the holes 415 and the fastening member 450 is fastened to the body 410, the reducer 12 is fixed at the inserted position.

The coupling assembly 430+450 is coupled to the body 410 and turned around the hinge shaft 420 at the first side of the body 410 to open/close the holes 415.

The coupling assembly 430+450 includes the cover member 430, the fastening member 450 rotatably connected to the cover member 430 and inserted in the coupling grooves 417, an elastic member 470 that provides a rotational force to the coupling assembly 430+450 when the holes 415 are opened, and a fastening-elastic member 490 pressing the fastening member 450 so that the fastening member 450 is inserted in the fastening grooves 417.

The cover member 430 has a top 431 and a pair of cover sides 432, first coupling holes 432 for coupling the body 410 are formed at first sides, that is, front end portions of the cover sides 433, and second coupling holes for coupling the fastening member 450 are formed at second sides of the cover sides 432. The first coupling holes 430 are formed at positions corresponding to the hinge holes so that the body 410 and the cover member 433 are coupled by a pin.

The fastening member 450 has a pair of fastening sides 451, coupling holes 451 formed at the fastening sides 453 to couple the cover member 430, and a fastener 455 that is inserted in the fastening holes 417. The coupling holes 453 are formed at positions corresponding to the second coupling holes so that the cover member 430 and the fastening member 450 are coupled by a pin. Further, though not shown in the figures, a grip may be provided at the upper end or lower end of the fastening member 450 for a user to operate the fastening member 450.

The elastic member 470 provides rotational force to the cover member 430 so that the cover member 430 is opened when the reducer 12 is inserted into or taken out of the holes 415. The elastic member 470 may be a leaf spring that is disposed inside the coupling assembly 430+450, particularly, inside the cover member 430. In particular, when the elastic member 470 is a leaf spring, the leaf spring is fixed by two stoppers 437 at both ends such that it convexly bends toward the holes 415 and can press the reducer 12 so that the reducer 12 is strongly fixed in the holes 415.

The fastening-elastic member 490 may be a leaf spring disposed outside the fastening member 450, as shown in FIG. 24. Similar to the elastic member 470, a stopper 430 is formed inside the cover member 430 to fix the fastening-elastic member 490.

The force that couples the fastening member 450 to the body 410 is maintained by the elasticity of the fastening-elastic member 490 pressing the fastening member 450 to the fastening grooves 417. Accordingly, the fastening member 450 can be stably maintained without being separated from the body 410.

The reducer-fixing bracket 400 shown in FIG. 25 is similar in configuration and operation to the reducer-fixing bracket shown in FIG. 24, but is different in that the elastic member 470 and the fastening-elastic member 490 are integrated.

As shown in FIG. 25, the elastic member 470 and the fastening-elastic member 490 are integrated and a support 439 is disposed between the elastic member 470 and the fastening-elastic member 490 to support them. The support 439 is disposed inside the cover member 430.

The reducer-fixing bracket 400 shown in FIG. 26 is similar in configuration and operation to the reducer-fixing bracket shown in FIG. 24, but is different in that there is provided an elastic member 470a that is a toggle spring.

As shown in FIG. 26, the elastic member 470a may be a toggle spring disposed inside the body 410 and the coupling assembly 430+450. When the elastic member 470a is a toggle spring, the toggle spring is fixed by a hinge shaft 420 and stretches toward the body 410 and the coupling assembly 430+450. Further, the fastening-elastic member 4909 is a leaf spring disposed outside the fastening member 450.

The reducer-fixing bracket 400 shown in FIG. 27 is similar in configuration and operation to the reducer-fixing bracket shown in FIG. 26, but is different in that there is provided a fastening-elastic member 490a that is a toggle spring.

As shown in FIG. 27, the elastic member 470a may be a toggle spring disposed inside the body 410 and the coupling assembly 430+450 and the fastening-elastic member 490a may be a toggle spring. When the fastening-elastic member 490a is a toggle spring, the toggle spring is fixed by a hinge shaft 421 and stretches toward the cover member 430 and the fastening member 450. Further, the elastic member 470a and the fastening-elastic member 490a may be integrated.

Embodiments of the present invention were described above and it will be apparent to those skilled in the art that the present invention may be modified in various ways without departing from the scope of the present invention, other than the embodiments described above. Therefore, the embodiments should be construed as examples, not specifying the present invention, and the present invention is not limited thereto and may be modified within the scope of claims or a range equivalent to the scope.

What is claimed is:

1. A fixing bracket of a sprinkler for fixing a reducer to a bar disposed across two channels, the fixing bracket having a body having holes for mounting the reducer, and a coupling assembly coupled to the body and turned around a hinge shaft at a first side of the body to open or close the holes,
   wherein the body has a pair of walls facing each other and having the holes, respectively, and fastening grooves formed at first sides of the walls, and
   the coupling assembly includes a cover member, a fastening member rotatably coupled to the cover member and inserted in the fastening grooves, and an elastic member providing rotational force to the coupling assembly when the holes are opened, wherein the coupling assembly further includes a fastening-elastic member pressing the fastening member to maintain the fastening member in the fastening grooves.

2. The fixing bracket of claim 1, wherein the cover member has a pair of cover sides, first coupling holes formed at the first sides of the cover sides to couple the body, and second coupling holes formed at second sides of the cover sides to couple the fastening member.

3. The fixing bracket of claim 1, wherein the fastening member has a pair of fastening sides, coupling holes formed at the fastening sides to couple the cover member, and a fastener inserted in the fastening grooves.

4. The fixing bracket of claim 1, wherein the elastic member is a leaf spring disposed inside the coupling assembly.

5. The fixing bracket of claim 1, wherein the elastic member is a toggle spring disposed inside the body and the coupling assembly.

6. The fixing bracket of claim 1, wherein the fastening-elastic member is a leaf spring disposed outside the fastening member.

7. The fixing bracket of claim 1, wherein the fastening-fixing member is integrated with the elastic member.

8. The fixing bracket of claim 1, wherein the fastening-elastic member is a toggle spring disposed inside the cover member and the coupling assembly.

9. A fixing bracket of a sprinkler for fixing a reducer to a bar disposed across two channels, the fixing bracket having a body having holes for mounting the reducer, and a coupling assembly coupled to the body and turned around a hinge shaft at a first side of the body to open or close the holes,
   wherein the body has a pair of walls facing each other and having the holes, respectively, and fastening grooves formed at first sides of the walls, and
   the coupling assembly includes a cover member, a fastening member rotatably coupled to the cover member and inserted in the fastening grooves, and an elastic member providing rotational force to the coupling assembly when the holes are opened, wherein the elastic member is a leaf spring disposed inside the coupling assembly.

10. The fixing bracket of claim 9, wherein the cover member has a pair of cover sides, first coupling holes formed at the first sides of the cover sides to couple the body, and second coupling holes formed at second sides of the cover sides to couple the fastening member.

11. The fixing bracket of claim 9, wherein the fastening member has a pair of fastening sides, coupling holes formed at the fastening sides to couple the cover member, and a fastener inserted in the fastening grooves.

* * * * *